Figure 1:
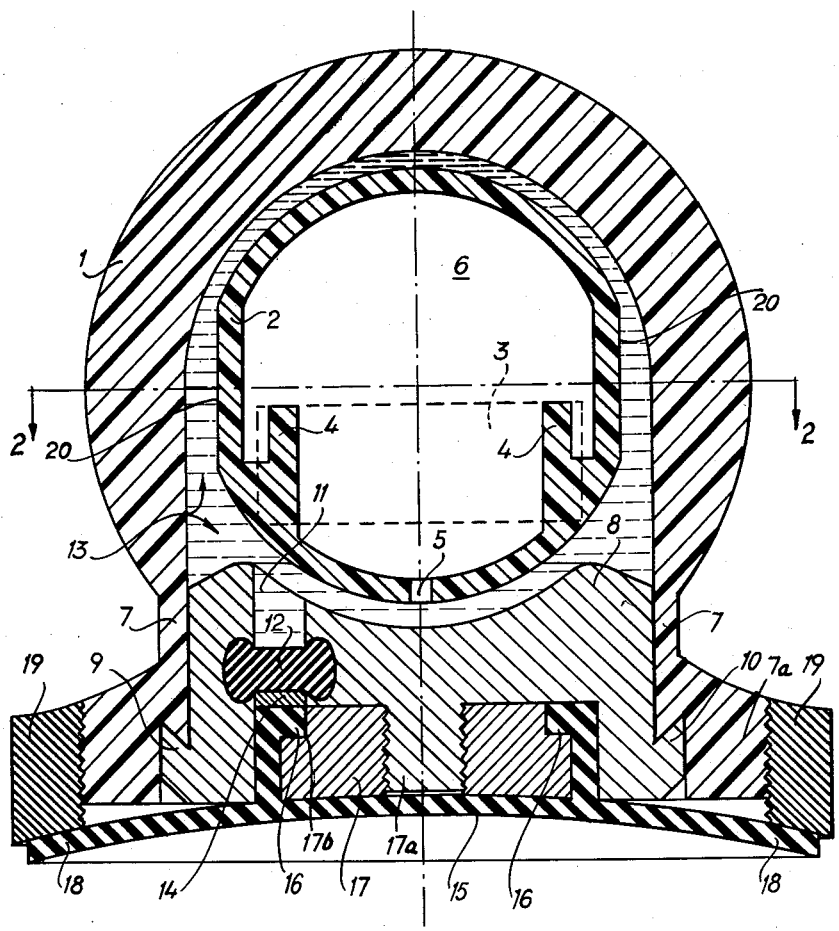

United States Patent Office 3,011,264
Patented Dec. 5, 1961

3,011,264
HYDROSTATIC SUSPENSION SYSTEMS FOR MAGNETIC NEEDLES
Pedro Pere Parera, 10 Vilana St., City of Barcelona, Province of Barcelona, Spain
Filed May 5, 1958, Ser. No. 733,104
Claims priority, application Spain Oct. 30, 1957
1 Claim. (Cl. 33—223)

The present invention relates to an improved hydrostatic suspension system for magnetic needles.

The embodiment devised in the invention is intended to provide a magnetic needle compass which has noticeable advantages and qualities as regards those known heretofore. These qualities and advantages may be summarized as follows:

(1) *Sensitivity.*—This compass, with a single, needle of relatively great mass, has a high magnetic moment. The pivot-fulcrum friction of the common compasses is avoided in the compass of the invention, as the suspension of the needle is effected through a layer of an antifreeze supporting liquid, obviating the pivot fulcrum friction usually found in other compasses of the tilting type.

(2) *Inertia.*—In the compass of the invention the inertia is very high, and movements are smoothed not only by the resisting function of the liquid friction, but also by the mechanical mass of the needle and azimuth dial. This inertia provides material steadiness in the readings, which fact makes the compass adaptable for the most sudden inclinations or changes.

(3) *Stability.*—The hydraulic suspension keeps the vertical line of the suspension center always passing through the gravity center, notwithstanding the magnetic inclination. The adaptation to all tilting dispenses with the need for the suspension of the housing.

The three factors which determine the accuracy of a magnetic compass are enhanced by the hydrostatic suspension relative to the usual compasses which use articulations of the pivot-fulcrum and Cardan types.

The elements comprising the ensemble which constitutes the magnetic compass are as follows: A movable compass or azimuth dial in the form of a hollow ball of a light and opaque material, and which has inserted therein a relatively-massive magnet which functions simultaneously as an orientating magnetic needle and as ballast for immersion and stability. The ball is provided with an opening at the lower pole thereof which is the one closest to the magnet.

This ball is suspended in a liquid contained in a spherical outer body or housing the suspension being established so that there exists practically a concentric position between both spheres as will be more fully described hereinafter.

The above housing is made of a translucent material and is hermetically closed except for a perforation concealed at the base thereof and closed by a lens-shaped diaphragm of rubber or like material through which the liquid which is to constitute the suspension element of the ball is injected, and the pressure is simultaneously adjusted, in a manner to be more fully pointed out hereinafter with the purpose of accurately regulating the immersion of this ball in order to keep it in correct position as regards the inner surface of the housing.

The leveling which is to provide the stability of the suspension is attained when, during the liquid injection, the liquid enters the ball through the opening of the latter, thereby increasing the air pressure within the ball and retaining in the latter a liquid supply which supplements the ballast action of the magnet and compensates for temperature changes. Once this balance is obtained, the diaphragm is sealed by means of a plastic seal.

In accordance with the above, an air chamber is established within the ball, which is adapted to change in volume and, therefore, in pressure as a function of the liquid enterting through the opening formed in the ball. The entrance of this liquid is caused by the expansion of the same and by the action of external agents, and in the contrary case, the outlet of some amount of liquid is caused thereby providing, due to the elasticity of air within the pneumatic chamber, for liquid volumetric variations effected by changes in ambient temperatures.

The pneumatic chamber is thus the essential feature for the correct suspension in the supporting liquid and, in order that the performance of the apparatus is ensured regardless of variations in the ambient temperature or other conditions which produce noticeable variations in the above liquid volume.

The ball has the characters of the azimuth dial engraved on the outer surface thereof, over the equatorial zone, which may be read through the transparent spherical housing which remains unchanged, a reference line being provided at an easily visible location on this housing, as well as other references which may be useful to define angles adapted to be related with the height, the climb or other data relative to orientation.

The ball keeps the equatorial zone thereof always horizontal, thereby constituting in practice an artificial horizon which makes the reading easier with respect to the above mentioned references. The equatorial line, that is to say the center line of this zone, is characterized by a visible trace which will cross all of the references of the azimuth dial engraved thereon.

The invention also comprises a special procedure for the industrial and economic manufacture of this apparatus.

Figure 2:
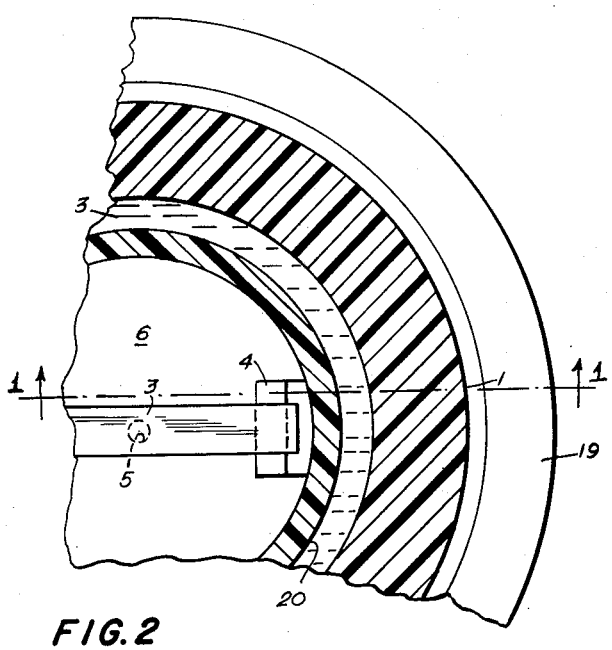

FIGURE 1 of the accompanying drawing shows a section through the device taken on line 1—1 of FIGURE 2; and FIGURE 2 is a fragmentary section taken on line 2—2 of FIGURE 1.

In this figure, the housing is indicated at 1. 2 is the ball with the magnet 3 thereof located in downwardly eccentric position and is suitably fastened to supports 4 provided on the inner surface of the ball. 5 indicates the compensating opening associated with the pneumatic chamber 6 within the ball 2.

The body 1 extends in a cylindrical body 7 which is tangential to the inner spherical surface thereof. This cylindrical extension comprises fastening means for retaining an additional bottom 8 with which the spherical hollow of the body 1 is completed, these means comprising the swallow-tail grooves 9 and 10, or any similar means, with the feature that the above additional bottom 8 has a passageway 11 which is perpendicular to the plane thereof, and closed by a rubber or the like diaphragm 12 which is adapted to be pierced by a needle to inject the liquid through the diaphragm to the space 13 formed between inner and outer spheres.

Complete closure is effected by a cap 14 covering the passageway 11 and backing the diaphragm 12.

A suction-cup outer fastening device is provided at the outside and comprises a resilient concave lamination 15, of a suitably flexible material, with a lateral clamping edge 16 against which the edge of the body 17 fits. The body 17 includes an interiorly threaded bore adapted to engage a threaded stem 17a depending from bottom 8 and has an annular peripheral flange 17b which engages the clamping edge 16 to hold the suction cup in position. A concaved suction disc 18 completes the assembly, and has secured to the outer rim thereof a locking nut 19 which engages the annular threaded edge of a rim 7a which comprises a continuation of the cylindrical body 7. The periphery of the suction disc extends beyond the body of the device and is stretched by the nut 19 to enhance the suction effect and to provide a stable mounting for the compass.

The lamination constituting the rubber or the like diaphragm 12 is located near to the inner wall of the additional bottom 8 in order that, should it become damaged for any reason, any air which might otherwise enter the system would be retarded by the plug 14, thereby avoiding any change in the pneumatic inner pressure of the ball 2.

From the figure, it appears that the position thereof corresponds to the case when the base is resting on a flat surface, and the equatorial line of the ball 2 will remain horizontal as required by the magnet 3 and the hydro-pneumatic ballasting system.

Whatever the position occupied by the body 1 may be, either with the base thereof towards one side, or with the base outwards, or in slanted position, the equatorial band will always be in horizontal position and, furthermore, the azimuth dial thereof will be orientated.

I claim:

An improved hydrostatic suspension compass, comprising a hollow transparent outer housing having a substantially spherical outer surface and a generally spherical inner surface, a hollow inner body having a substantially spherical outer surface, said inner body being positioned within the said housing with its outer surface closely adjacent the inner surface of the housing, said inner body having an opening therein communicating with the space between the outer surface of the inner body and the inner surface of the housing, a compass needle secured within said inner body and being offset from the diametral plane of the inner body in the direction of said opening, a liquid substantially filling the space between the housing and inner body thereby suspending the inner body in concentric relation to the housing, and a closing and sealing means on the outer housing comprising a passageway extending transversely of said closing means, a lamination sealing the said passageway and adapted to be pierced by a needle so that liquid injected by such needle may enter the space between the housing and inner body to fill the space with liquid and with a portion of the liquid entering the inner body through said opening due to the injection pressure, the amount of liquid being such that a portion of said liquid enters the inner body through said opening for establishing a compensating hydro-pneumatic condition serving to absorb the alternate volume changes of the suspension liquid caused by external agents.

References Cited in the file of this patent

UNITED STATES PATENTS

| | | |
|---|---|---|
| 1,306,882 | Clarke | June 17, 1919 |
| 1,397,490 | Peradotto | Nov. 15, 1921 |
| 1,994,998 | Hull | Mar. 19, 1935 |
| 2,192,148 | Otto | Feb. 27, 1940 |
| 2,724,858 | Reichert | Nov. 29, 1955 |
| 2,830,381 | Morris | Apr. 15, 1958 |

FOREIGN PATENTS

| | | |
|---|---|---|
| 92,340 | Sweden | May 17, 1938 |
| 1,156,628 | France | Dec. 16, 1957 |